(No Model.)
C. D. P. GIBSON.
STORAGE BATTERY PLATE.
No. 383,640. Patented May 29, 1888.
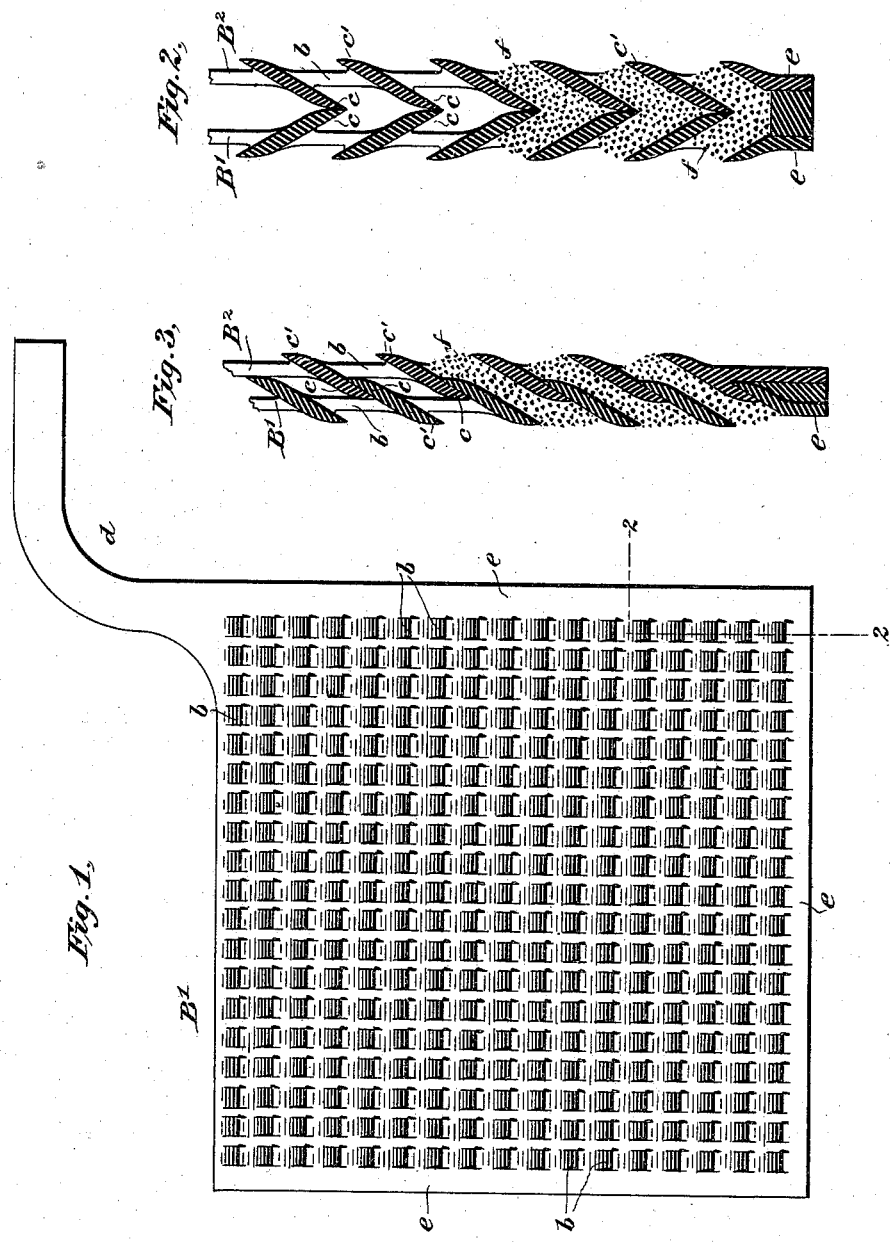
Witnesses.
Geo. W. Breck.
Edward Thorpe.
Inventor.
Chas. D. P. Gibson.
By his Attorneys
Pope Edgecomb & Terry.

UNITED STATES PATENT OFFICE.

CHARLES D. P. GIBSON, OF NEW YORK, N. Y.

STORAGE-BATTERY PLATE.

SPECIFICATION forming part of Letters Patent No. 383,640, dated May 29, 1888.

Application filed March 3, 1888. Serial No. 266,070. (No model.)

*To all whom it may concern:*

Be it known that I, CHARLES D. P. GIBSON, a citizen of the United States, residing in New York, in the county and State of New York, have invented certain new and useful Improvements in Storage-Battery Plates, of which the following is a specification.

The invention relates to storage-batteries or accumulators; and it consists in a novel form of supporting-plates or electrodes which permits of the application of the active material thereto, so that it is reliably retained within the body of the plate and yet exposed sufficiently to the action of the electrolytic fluid.

The efficiency and durability of service of storage-batteries depend greatly upon the secure manner in which the active material is attached to and held in contact with the supporting-plates. When simply placed in contact with the surface of the plate, it is caused to be separated by the continued charging and discharging of the battery, by reason of which the battery loses its capacity for storage and eventually becomes useless. By the present invention the plate and active material are firmly bound together and held in close contact.

The invention consists, in general terms, in uniting two separate plates or sheets of lead, each of which has inclined openings or perforations formed within it, the metal of the plate being pressed inward immediately above each opening and outward below the opening. The two plates are then placed against each other with the inward projections in contact with each other, either touching each other at the extremities or locking into each other. Usually the plates are placed so that the edges touch each other, and the openings are directed upward, so that the completed plate has the appearance of being made up of vertically-inclined cells. The edges of the plates are then secured together by sweating, or in any other suitable manner. The completed plate may then be filled with active material by brushing the latter over its surface, and it is in this way readily forced into the openings or receptacles, entering the open spaces between the two plates in such manner that it is securely locked within the plate without, however, being secluded from contact with the electrolytic fluid.

In the accompanying drawings, Figure 1 is a side elevation of the plate embodying the features of the invention. Fig. 2 is an enlarged transverse section of a portion of the same. Fig. 3 is a similar view of a modified form of plate.

Referring to the figures, $B'$ and $B^2$ represent two separate sheets of metal designed to constitute the conducting-support of the plate, which is preferably of metallic lead. Through the entire surface of each plate there are formed openings $b$, closely adjacent to each other. These may with advantage be formed in regular series—that is to say, in vertical and horizontal lines. The metal is pressed outward from the body of the plate in one direction, as shown at $c$, at one side of the opening, and in the other direction, as shown at $c'$, at the other side, thus giving the opening the appearance of an inclined cell. The plates are placed against each other, so that the inner projections, $c$, thus formed touch each other, and thus the two sheets of metal are brought into close metallic connection with each other throughout their surfaces. The edges $e$ of the plates are preferably left solid, as shown, and they are sweated or otherwise fastened together, so as to form a single battery-plate.

The openings being arranged systematically, the projections $c$ will fall opposite each other, as indicated in Fig. 2, and thus afford a plate which, while very light in weight, will be capable of receiving a large amount of active material, $f$, and holding it securely in place. The active material may be conveniently applied by throwing it upon the plate and brushing it with the hand or otherwise over the outer projections, $c'$, so that it will fall into the openings, each side being treated in the same manner. This not only fills the cells, but the whole of the space between the plates.

Electrical connection may be made with the plate through an extension, $d$, leading from the plate in any convenient manner.

Some of the advantages of this form are: The plates are very light, while presenting a large surface of both the metal and the active material to the action of the electrolyte. They have great strength and hold the proper shape after long use. The active material is held securely in place and still is open to the action of the electrolyte. In practice it is not always certain or necessary that all the projections of the two plates should be in contact. A large proportion of them, however, will usually touch each other, so that metallic contact throughout the general surfaces of the plates is secured. In some instances it may be desirable to have the openings in the two sheets B' and B² extended in opposite directions, as shown in Fig. 3, so that the projections c will lock into each other.

It will be understood that the invention pertains only to the construction of the plates or electrodes of the storage-batteries, and that the nature of the material used and the methods of charging and use do not form a part of this invention. In the present state of the art metallic lead is understood to be the most effective material for the supporting-plates, and the peroxide of lead is generally supposed to be the most useful active material; but the present invention is applicable to other materials and is not confined to any.

I claim as my invention—

1. A storage-battery plate consisting of two sheets of metal, each formed with openings, as described, the metal around said openings being forced outward on each side of the plate, so as to form projections, and placed together with the projections on one plate touching the projections on the other plate.

2. A storage-battery plate consisting of two sheets of metal, each having inclined perforations or openings for receiving the active material, the metal at the base of each opening in each plate being in metallic contact with the metal of the other plate.

3. A storage-battery plate consisting of two sheets of metal, each having perforations throughout its surface, projections of metal being thrown out from both sides of the plate, the projections upon the contiguous surfaces of the respective plates being in contact, and active material in said openings and in the space between the plates.

4. A storage-battery plate consisting of the two sheets B' and B², each having openings or perforations b, and projections thrown out in opposite directions from the general surface of the sheets, said sheets being secured together, substantially as described.

5. A storage-battery plate consisting of the two sheets B' B², each having openings or perforations b, and projections thrown out in opposite directions from the general surface of the sheets, said sheets being secured together, and active material contained within the openings.

In testimony whereof I have hereunto subscribed my name this 28th day of February, A. D. 1888.

CHAS. D. P. GIBSON.

Witnesses:
DANL. W. EDGECOMB,
CHARLES A. TERRY.